(12) United States Patent
Palanki et al.

(10) Patent No.: US 8,320,407 B2
(45) Date of Patent: Nov. 27, 2012

(54) MAPPING OF SUBPACKETS TO RESOURCES IN A COMMUNICATION SYSTEM

(75) Inventors: Ravi Palanki, San Diego, CA (US); Jeremy H. Lin, San Diego, CA (US); Aamod Khandekar, San Diego, CA (US); Alexei Gorokhov, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 11/968,631

(22) Filed: Jan. 2, 2008

(65) Prior Publication Data

US 2008/0240159 A1    Oct. 2, 2008

Related U.S. Application Data

(60) Provisional application No. 60/883,702, filed on Jan. 5, 2007, provisional application No. 60/883,758, filed on Jan. 5, 2007.

(51) Int. Cl.
*H04J 4/00* (2006.01)
(52) U.S. Cl. ......... 370/478; 370/441; 370/442; 370/474
(58) Field of Classification Search .................. 370/441, 370/442, 474, 478, 498; 375/130, 131, 132, 375/138
See application file for complete search history.

(56) References Cited

U.S. PATENT DOCUMENTS

| 4,926,416 | A  | * | 5/1990 | Weik | 370/354 |
|---|---|---|---|---|---|
| 5,864,577 | A | * | 1/1999 | Ramel | 375/130 |
| 5,896,357 | A | * | 4/1999 | Shinozaki et al. | 720/643 |
| 6,278,685 | B1 | * | 8/2001 | Yonge et al. | 370/203 |
| 6,400,699 | B1 | * | 6/2002 | Airy et al. | 370/329 |
| 6,768,713 | B1 |   | 7/2004 | Siala et al. | |
| 6,845,104 | B2 | * | 1/2005 | Johnson et al. | 370/442 |

(Continued)

FOREIGN PATENT DOCUMENTS

CA    2605556 A1    12/2006

(Continued)

OTHER PUBLICATIONS

3GPP2 C.S0084-002, Version 2, "Medium Access Control Layer for Ultra Mobile Broadband (UMB) Air Interface Specification," Aug. 2007.

(Continued)

*Primary Examiner* — Andrew Lai
(74) *Attorney, Agent, or Firm* — Donald C. Kordich

(57) ABSTRACT

Techniques for transmitting data in a communication system are described. A packet may be partitioned into multiple subpackets, and each subpacket may be encoded separately. The subpackets may be mapped to resources assigned for transmission of the packet, with at least one subpacket being mapped to a subset of the assigned resources. The assigned resources may include multiple tiles, with each tile corresponding to a block of time frequency resources. The subpackets may be mapped to the tiles such that (i) the subpackets are mapped to equal number of tiles to achieve similar decoding performance, (ii) each subpacket is mapped to at least $N_{MIN}$ tiles, if available, to achieve a certain minimum diversity order for the subpacket, and/or (iii) each subpacket is mapped to a subset of the multiple tiles, if possible, so that the subpacket can be decoded without having to demodulate all of the tiles.

36 Claims, 11 Drawing Sheets

U.S. PATENT DOCUMENTS

| | | |
|---|---|---|
| 6,928,066 B1 | 8/2005 | Moon et al. |
| 7,242,722 B2 | 7/2007 | Krauss et al. |
| 7,554,948 B2 | 6/2009 | Naguib et al. |
| 2004/0062321 A1 | 4/2004 | Nakamura et al. |
| 2005/0084000 A1 | 4/2005 | Krauss et al. |
| 2005/0135324 A1 | 6/2005 | Kim et al. |
| 2005/0163194 A1 | 7/2005 | Gore et al. |
| 2006/0109810 A1 | 5/2006 | Au et al. |
| 2006/0209973 A1 | 9/2006 | Gorokhov et al. |
| 2006/0274691 A1* | 12/2006 | Naguib et al. ............ 370/330 |
| 2006/0285503 A1 | 12/2006 | Mese et al. |
| 2007/0009054 A1 | 1/2007 | Kwak et al. |
| 2008/0019314 A1 | 1/2008 | Gorokhov et al. |
| 2008/0165969 A1 | 7/2008 | Khandekar et al. |
| 2008/0166969 A1 | 7/2008 | Gorokhov et al. |
| 2008/0167040 A1 | 7/2008 | Khandekar et al. |

FOREIGN PATENT DOCUMENTS

| | | |
|---|---|---|
| EP | 0650304 A2 | 4/1995 |
| EP | 0917305 A2 | 5/1999 |
| EP | 1289328 | 3/2003 |
| JP | 10502507 | 3/1998 |
| JP | 2005333677 A | 12/2005 |
| JP | 2006203355 A | 8/2006 |
| JP | 2006311465 A | 11/2006 |
| JP | 2008546316 A | 12/2008 |
| JP | 2008547252 A | 12/2008 |
| KR | 20000026410 A | 5/2000 |
| RU | 99126427 | 10/2001 |
| RU | 2187205 C2 | 8/2002 |
| RU | 2191477 | 10/2002 |
| RU | 2242091 C2 | 12/2004 |
| RU | 2250564 | 4/2005 |
| RU | 2257008 | 7/2005 |
| RU | 2282943 C2 | 8/2006 |
| WO | WO9852326 A2 | 11/1998 |
| WO | WO0013427 A2 | 3/2000 |
| WO | WO0101596 | 1/2001 |
| WO | WO0117125 A1 | 3/2001 |
| WO | WO0126269 | 4/2001 |
| WO | WO02058300 A1 | 7/2002 |
| WO | WO03001741 A1 | 1/2003 |
| WO | WO03032564 | 4/2003 |
| WO | WO2005046259 A2 | 5/2005 |
| WO | WO2005076552 | 8/2005 |
| WO | WO2006007318 A1 | 1/2006 |
| WO | WO2006094299 A1 | 9/2006 |
| WO | WO2006099546 A1 | 9/2006 |
| WO | WO2006099547 A1 | 9/2006 |
| WO | WO2006125150 A2 | 11/2006 |
| WO | WO2006130742 | 12/2006 |
| WO | WO2006133598 A1 | 12/2006 |
| WO | WO2006137708 | 12/2006 |
| WO | WO2007146930 | 12/2007 |
| WO | WO2008086244 | 7/2008 |

OTHER PUBLICATIONS

IEEE 802.16 IEEE Standard for Local and metropolitan area networks, Part 16: Air Interface for Fixed Broadband Wireless Access Systems, IEEE Std. 802.16-2004 (Revision of IEEE Std. 802.16-2001), Oct. 1, 2004.

802.16e-2005 and IEEE Std 802.16-2004/Cor1-2005; Section 8.4.6.1.1 Preamble, Published 2006 IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1.

IEEE 802.11, IEEE Wireless LAN Edition, A Compilation Based on IEEE Std. 802. Nov. 1999 (R2003) and its Amendments.

IEEE Std. 802.20, 802.20/D0.2m, Jun. 2007, Draft Standard for Local and Metropolitan Area Networks—Standard Air Interface for Mobile Broadband Wireless Access Systems Supporting Vehicular Mobility—Physical and Media Access Control Layer Specification.

Translation of Office Action in Russian application 2009129959 corresponding to U.S. Appl. No. 11/968,631, citing WO2006046894A1, WO2006002658A1, RU99126427 and RU2187205 dated Mar. 21, 2011.

Written Opinion—PCT/US08/050080, International Search Authority, European Patent Office, May 27, 2008.

Taiwan Search Report—TW097100515—TIPO—Dec. 15, 2011.

\* cited by examiner

| | | | | | | | | |
|---|---|---|---|---|---|---|---|---|
| 15 | P | P | P | $A_{21}$ | $B_{26}$ | P | P | P |
| 14 | $C_4$ | $A_{10}$ | $B_{15}$ | $C_{20}$ | $A_{26}$ | $B_{31}$ | $C_{36}$ | $A_{42}$ |
| 13 | $B_4$ | $C_9$ | $A_{15}$ | $B_{20}$ | $C_{25}$ | $A_{31}$ | $B_{36}$ | $C_{41}$ |
| 12 | $A_4$ | $B_9$ | $C_{14}$ | $A_{20}$ | $B_{25}$ | $C_{30}$ | $A_{36}$ | $B_{41}$ |
| 11 | $C_3$ | $A_9$ | $B_{14}$ | $C_{19}$ | $A_{25}$ | $B_{30}$ | $C_{35}$ | $A_{41}$ |
| 10 | $B_3$ | $C_8$ | $A_{14}$ | $B_{19}$ | $C_{24}$ | $A_{30}$ | $B_{35}$ | $C_{40}$ |
| 9 | $A_3$ | $B_8$ | $C_{13}$ | $A_{19}$ | $B_{24}$ | $C_{29}$ | $A_{35}$ | $B_{40}$ |
| 8 | P | P | P | $C_{18}$ | $A_{24}$ | P | P | P |
| 7 | $B_2$ | $C_7$ | $A_{13}$ | $B_{18}$ | $C_{23}$ | $A_{29}$ | $B_{34}$ | $C_{39}$ |
| 6 | $A_2$ | $B_7$ | $C_{12}$ | $A_{18}$ | $B_{23}$ | $C_{28}$ | $A_{34}$ | $B_{39}$ |
| 5 | $C_1$ | $A_7$ | $B_{12}$ | $C_{17}$ | $A_{23}$ | $B_{28}$ | $C_{33}$ | $A_{39}$ |
| 4 | $B_1$ | $C_6$ | $A_{12}$ | $B_{17}$ | $C_{22}$ | $A_{28}$ | $B_{33}$ | $C_{38}$ |
| 3 | $A_1$ | $B_6$ | $C_{11}$ | $A_{17}$ | $B_{22}$ | $C_{27}$ | $A_{33}$ | $B_{38}$ |
| 2 | $C_0$ | $A_6$ | $B_{11}$ | $C_{16}$ | $A_{22}$ | $B_{27}$ | $C_{32}$ | $A_{38}$ |
| 1 | P | P | P | $B_{16}$ | $C_{21}$ | P | P | P |
| 0 | $A_0$ | $B_5$ | $C_{10}$ | $A_{16}$ | $B_{21}$ | $C_{26}$ | $A_{32}$ | $B_{37}$ |
| | 0 | 1 | 2 | 3 | 4 | 5 | 6 | 7 |

Hop-Port Index (vertical axis); OFDM Symbol Index (horizontal axis)

P = Pilot Symbol; ☐ = Data Symbol $A_k$ = Subpacket 0
$B_k$ = Subpacket 1
$C_k$ = Subpacket 2

*FIG. 5*

MAPPING OF SUBPACKETS TO RESOURCES IN A COMMUNICATION SYSTEM

The present application claims priority to provisional U.S. Application Ser. No. 60/883,702, entitled "DCH SUB-PACKET INTERLEAVING," and provisional U.S. Application Ser. No. 60/883,758, entitled "WIRELESS COMMUNICATION SYSTEM," both filed Jan. 5, 2007, assigned to the assignee hereof and incorporated herein by reference.

BACKGROUND

I. Field

The present disclosure relates generally to communication, and more specifically to techniques for transmitting data in a communication system.

II. Background

In a communication system, a transmitter may encode a packet of data to obtain code bits and generate modulation symbols based on the code bits. The transmitter may then map the modulation symbols to time frequency resources assigned for the packet and may further process and transmit the mapped modulation symbols via a communication channel. A receiver may obtain received symbols for the data transmission and may perform the complementary processing to recover the transmitted packet.

It may be desirable for the transmitter to process and transmit the packet in a manner such that good performance can be achieved for the data transmission and such that the receiver can recover the packet in an efficient manner. There is therefore a need in the art for techniques to efficiently transmit packets in a communication system.

SUMMARY

Techniques for transmitting packets in a manner to achieve good performance and low decoding latency are described herein. In an aspect, a packet may be partitioned into multiple subpackets, and each subpacket may be sent on all or a subset of the resources assigned for transmission of the packet. The mapping of subpackets to resources may be referred to as subpacket interleaving. Each subpacket may be encoded separately and may be decoded separately. The assigned resources may include multiple tiles, with each tile corresponding to a block of time frequency resources. The subpackets may be mapped to the tiles such that (i) the subpackets are mapped to equal number of tiles to achieve similar decoding performance, (ii) each subpacket is mapped to at least $N_{MIN}$ tiles to achieve a certain minimum diversity order for the subpacket, and/or (iii) each subpacket is mapped to a subset of the tiles so that the subpacket can be decoded without having to demodulate all of the tiles.

In one design, a transmitter may determine resources assigned for transmission of a packet. The transmitter may partition the packet into multiple subpackets, process (e.g., encode) each subpacket, and map the multiple subpackets to the assigned resources. At least one subpacket may be mapped to a subset of the assigned resources, i.e., less than all of the assigned resources. For example, at least one subpacket may be mapped to a subset of the assigned tiles.

In one design, a receiver may determine the resources assigned for transmission of the packet. The receiver may receive the multiple subpackets of the packet via the assigned resources and demap the subpackets from the assigned resources. At least one subpacket may be demapped from a subset of the assigned resources, e.g., a subset of the assigned tiles. The receiver may then process (e.g., decode) the subpackets after demapping to recover the packet.

Various aspects and features of the disclosure are described in further detail below.

BRIEF DESCRIPTION OF THE DRAWINGS

FIG. 5 shows mapping of three subpackets to transmission units in one tile.

DETAILED DESCRIPTION

The techniques described herein may be used for various wireless communication systems and networks. The terms "system" and "network" are often used interchangeably. For example, the techniques may be used for wireline communication systems, wireless communication systems, wireless local area networks (WLANs), etc. The wireless communication systems may be Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMB, and UMB terminology is used in much of the description below. UMB is described in 3GPP2 C.S0084-001, entitled "Physical Layer for Ultra Mobile Broadband (UMB) Air Interface Specification," August 2007, which is publicly available.

Figure 1:
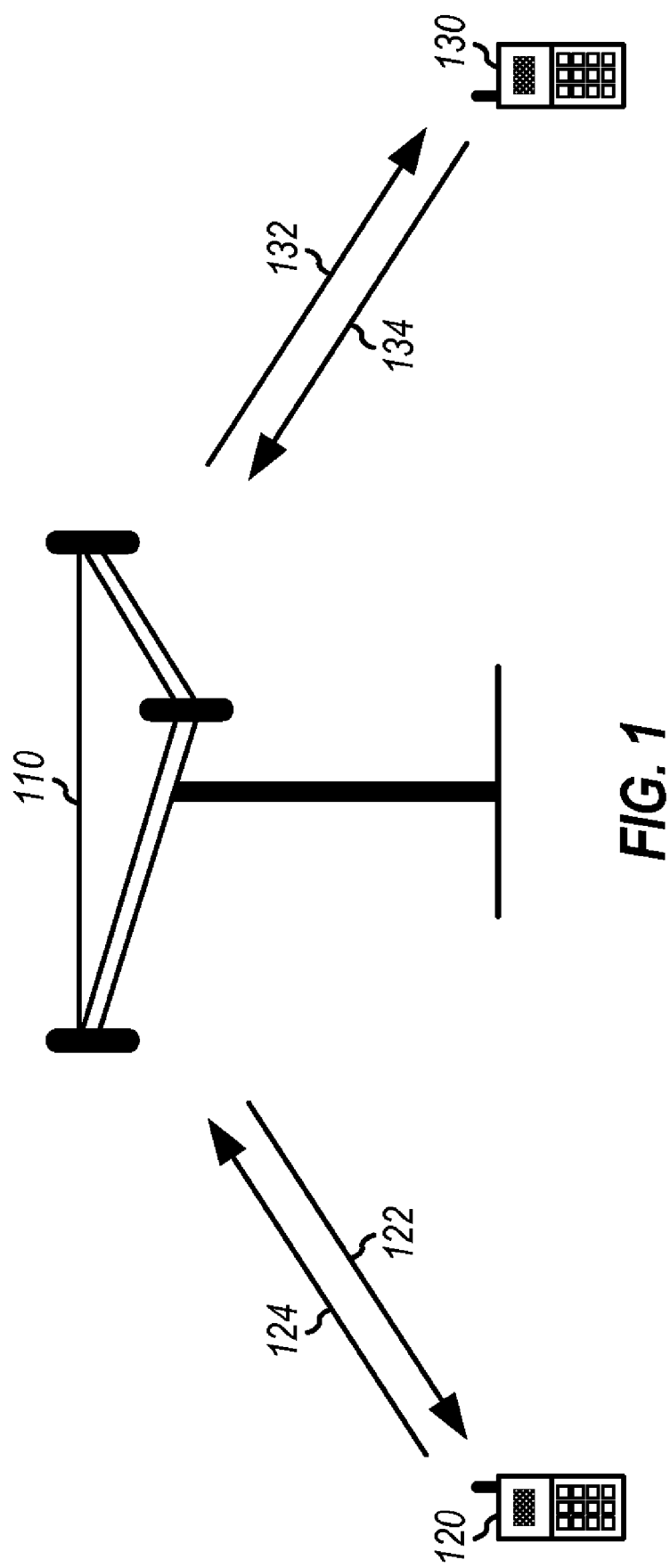
FIG. 1 shows a wireless communication system.

FIG. 1 shows a wireless communication system 100, which may also be referred to as an access network (AN). For simplicity, only one base station 110 and two terminals 120 and 130 are shown in FIG. 1. A base station is a station that communicates with the terminals. A base station may also be referred to as an access point, a Node B, an evolved Node B, etc. A terminal may be stationary or mobile and may also be referred to as an access terminal (AT), a mobile station, a user equipment, a subscriber unit, a station, etc. A terminal may be a cellular phone, a personal digital assistant (PDA), a wireless communication device, a wireless modem, a handheld device, a laptop computer, a cordless phone, etc. A terminal may communicate with one or more base stations on the forward and/or reverse links at any given moment. The forward link (or downlink) refers to the communication link from the base stations to the terminals, and the reverse link (or uplink) refers to the communication link from the terminals to the base stations. In FIG. 1, terminal 120 may receive data from base station 110 via forward link 122 and may transmit data via reverse link 124. Terminal 130 may receive data from base station 110 via forward link 132 and may transmit data via reverse link 134. The techniques described herein may be used for transmission on the forward link as well as the reverse link.

The system may utilize orthogonal frequency division multiplexing (OFDM) and/or single-carrier frequency division multiplexing (SC-FDM). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the number of subcarriers may be dependent on the system bandwidth.

Figure 2:
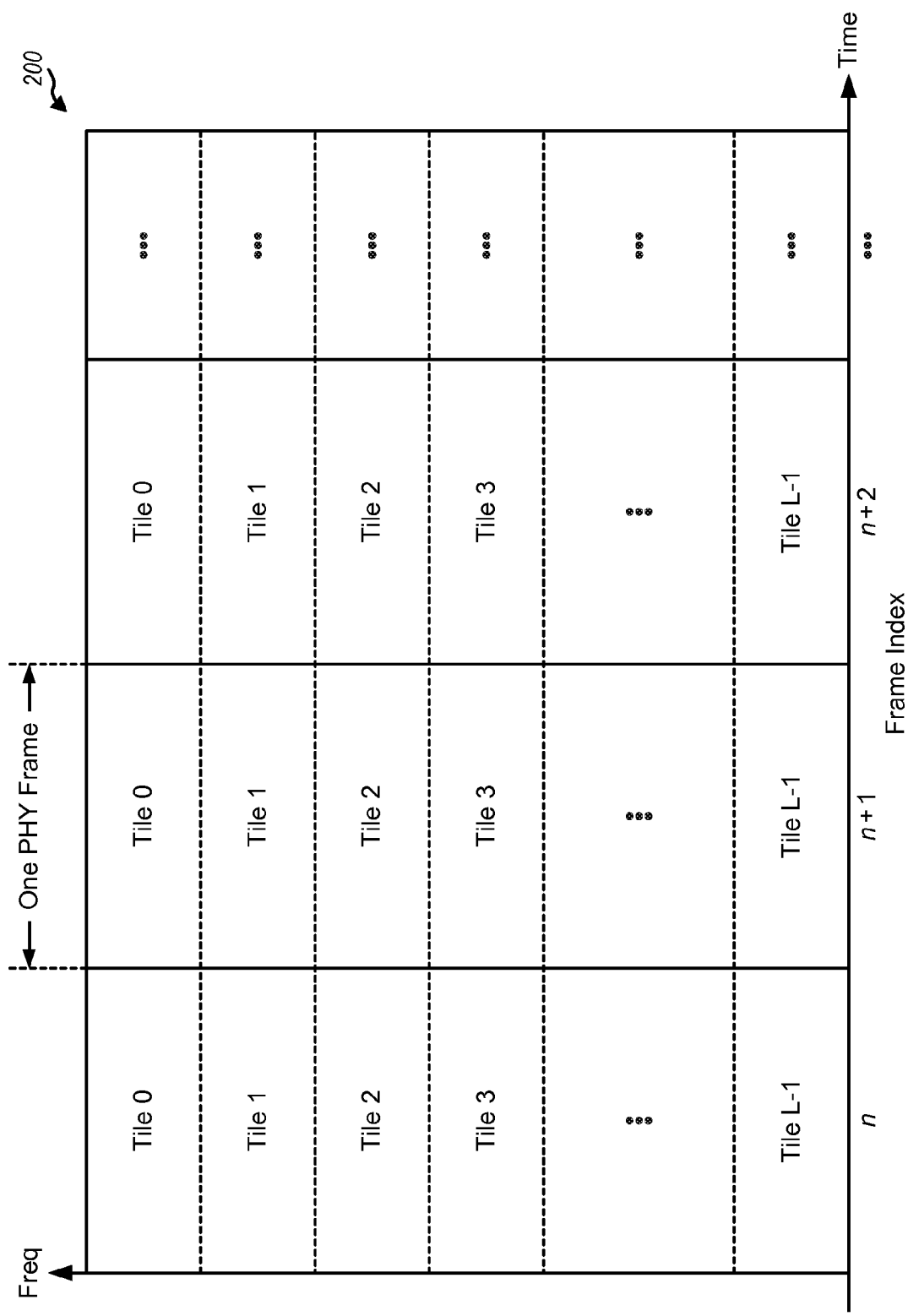
FIG. 2 shows an example frame structure.

FIG. 2 shows a design of a frame structure 200 that may be used for the forward and/or reverse link. The transmission timeline for a given link may be partitioned into units of physical layer (PHY) frames. Each PHY frame may span a particular time duration, which may be fixed or configurable. In one design, each PHY frame covers $N_{FRAME}$ OFDM symbol periods, where $N_{FRAME}$ may be equal to 4, 6, 8 or some other value.

The time frequency resources available for a given link may be partitioned into tiles. A tile may also be referred to as a time frequency block, a resource block (e.g., in E-UTRA/LTE), etc. A tile may cover a particular time and frequency dimension, which may be fixed or configurable. In general, a tile may include physical resources or logical resources that may be mapped to physical resources. In one design, K hop-ports may be defined and may be mapped to the K total subcarriers based on a known mapping. The tiles may then be defined based on either subcarriers (which are physical resources) or hop-ports (which are logical resources).

In general, a tile may cover time frequency resources of any size, dimension, shape, and characteristic. In one design, a tile may cover a block of contiguous time frequency resources. In another design, a tile may cover a block of time frequency resources that may be distributed across the system bandwidth and/or over time. In one design that is assumed in much of the description below, each tile may cover $N_{BLOCK}$ hop-ports in $N_{FRAME}$ OFDM symbol periods. In one design, each PHY frame covers 8 OFDM symbol periods, and each tile covers $N_{BLOCK}$=16 hop-ports in $N_{FRAME}$=8 OFDM symbol periods. A PHY frame and a tile may also have other sizes. In the design shown in FIG. 2, each PHY frame includes L tiles with indices of 0 through L−1. The number of tiles in each PHY frame (L) may be dependent on the total number of subcarriers (K), which may in turn be dependent on the system bandwidth. The $N_{BLOCK}$ hop-ports in each tile may be mapped to contiguous subcarriers or subcarriers distributed across the system bandwidth.

Table 1 shows five different system bandwidths that may be supported and the number of subcarriers/hop-ports and the total number of tiles for each system bandwidth, in accordance with one design. A terminal may have an assignment that is smaller than the total number of tiles in the system bandwidth.

TABLE 1

| System Bandwidth | Number of Subcarriers | Total Number of Tiles |
|---|---|---|
| 1.25 MHz | 128 | 8 |
| 2.5 MHz | 256 | 16 |
| 5 MHz | 512 | 32 |
| 10 MHz | 1024 | 64 |
| 20 MHz | 2048 | 128 |

The system may support global hopping and local hopping, which may also be referred to as SymbolRateHopping and BlockHopping, respectively. For global hopping, a packet may be sent on Distributed Resource Channel (DRCH) resources, which may comprise a set of hop-ports mapped to subcarriers distributed across all or a large portion of the system bandwidth. The mapping of hop-ports to subcarriers may vary within a PHY frame for global hopping. For local hopping, a packet may be sent on Block Resource Channel (BRCH) resources, which may comprise a set of hop-ports mapped to contiguous subcarriers within a subzone. A subzone may cover a particular number of (e.g., 64 or 128) subcarriers. The mapping of hop-ports to subcarriers may be constant across a PHY frame for local hopping. Other hopping schemes may also be supported for the forward and reverse links.

The system may support hybrid automatic retransmission (HARQ). For HARQ, a transmitter may send one or more transmissions for a packet until the packet is decoded correctly by a receiver, or the maximum number of transmissions has been sent, or some other termination condition is encountered. HARQ may improve reliability of data transmission.

FIG. 2 shows a specific PHY frame/tile structure design. Other frame structures may also be used to send traffic data, signaling, pilot, etc. The available time frequency resources may also be partitioned in other manners. For clarity, the following description assumes the PHY frame/tile structure shown in FIG. 2.

A transmitter (e.g., a base station or a terminal) may transmit one or more packets to a receiver (e.g., a terminal or a base station) using time frequency resources assigned for transmission of the packet(s). It is desirable to transmit each packet such that good performance can be achieved for the packet transmission and such that the receiver can recover the packet in an efficient manner.

In an aspect, a packet may be partitioned into t subpackets, where in general t≧1. Each subpacket may be encoded separately and sent on all or a subset of the assigned resources. The assigned resources may include $N_{TILES}$ tiles, where in general $N_{TILES}$≧1. The t subpackets may be mapped to the $N_{TILES}$ tiles in accordance with one or more of the following:

Map the t subpackets to equal number of tiles so that the t subpackets can achieve similar decoding performance, Map each subpacket to a subset of the $N_{TILES}$ tiles, if possible, so that the subpacket can be decoded without having to demodulate all $N_{TILES}$ tiles, and Map each subpacket to at least $N_{MIN}$ tiles to achieve a certain minimum diversity order for the subpacket, where in general $N_{MIN}$≧1.

The above mapping characteristics may be achieved as described below.

Figure 3:
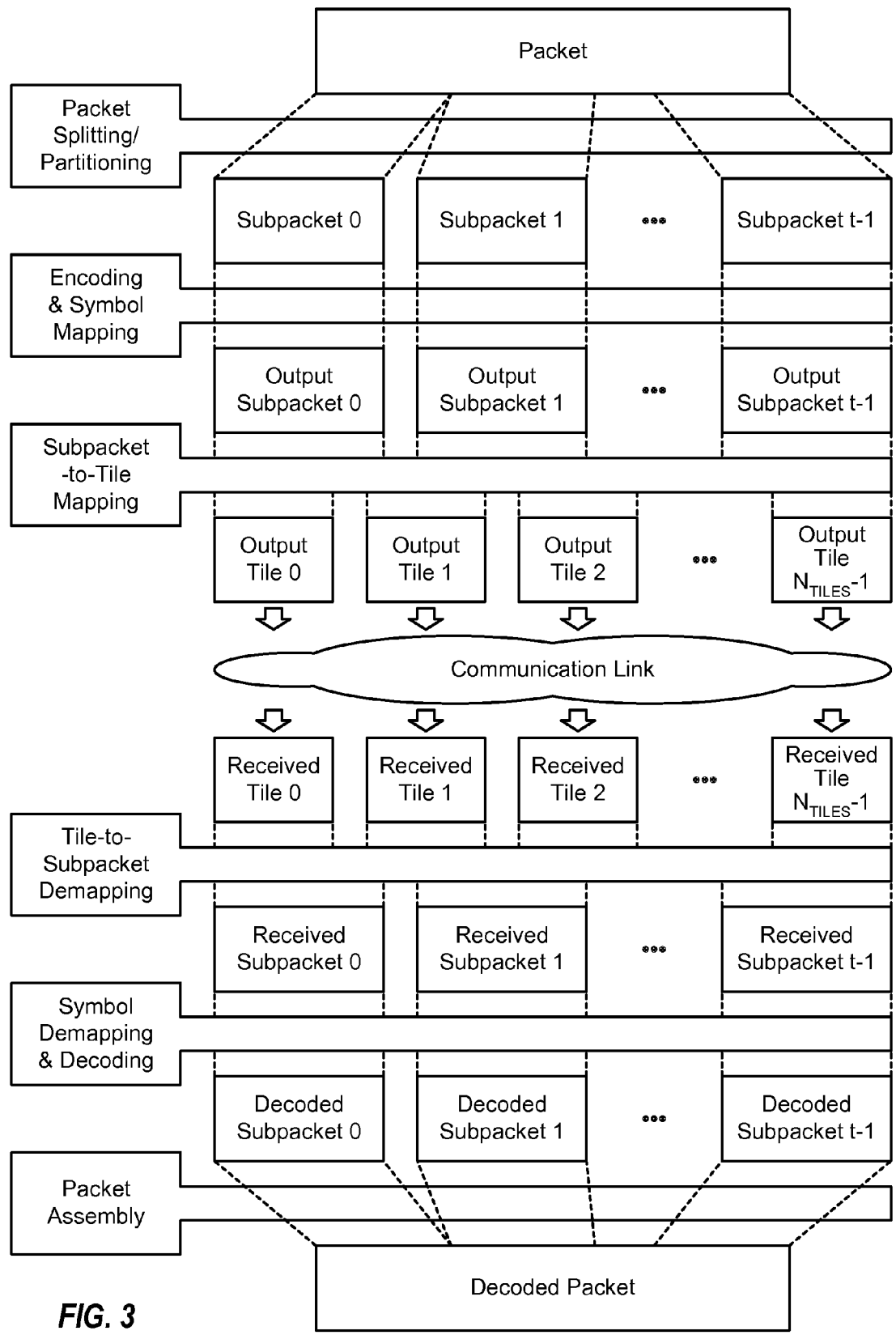
FIG. 3 shows transmission and reception of a packet.

FIG. 3 shows a design of transmission and reception of a packet. A transmitter may determine the size of a packet as follows:

$$\text{PacketSize}=8\lfloor \rho n_0 N_t/8 \rfloor - N_{CRC,Data}, \quad \text{Eq(1)}$$

where ρ is the spectral efficiency of the first transmission of the packet, $n_0$ is the number of usable hop-ports for the first transmission of the packet, $N_f$ is the number of PHY frames in which the packet is sent, $N_{CRC,Data}$ is the number of cyclic redundancy check (CRC) bits for the packet, PacketSize is the size of the packet, and "$\lfloor \ \rfloor$" denotes a floor operator.

The spectral efficiency ρ may be determined based on channel conditions, which may be estimated by a receiver and sent to the transmitter. $N_f$ may be equal to $6N_{FRAME}$ if the packet is part of an extended duration transmission and may be equal to $N_{FRAME}$ otherwise. The packet size may also be determined in other manners.

The packet may be partitioned or split into t subpackets. In one design, the packet may be partitioned if it is larger than a maximum subpacket size, as follows:

$$t = \left\lceil \frac{PacketSize}{MaxSubPacketSize} \right\rceil, \quad \text{Eq (2)}$$

where MaxSubPacketSize is the maximum subpacket size, and "$\lceil \ \rceil$" denotes a ceiling operator.

The packet may be partitioned such that each subpacket contains approximately equal number of bits or bytes. Each subpacket may be processed (e.g., encoded, interleaved, and symbol mapped) separately to obtain a corresponding output subpacket. The t output subpackets may be mapped to $N_{TILES}$ tiles based on a subpacket-to-tile mapping described below. The modulation symbols in the $N_{TILES}$ tiles may be processed and transmitted via a communication link.

At the receiver, the packet transmission from the transmitter may be processed to obtain detected symbols for the $N_{TILES}$ tiles used for the packet. The detected symbols may be estimates of the modulation symbols sent in the tiles. The receiver may demap the t received subpackets from the $N_{TILES}$ tiles in a manner complementary to the subpacket-to-tile mapping performed by the transmitter. Each received subpacket may be processed (e.g., symbol demapped, deinterleaved, and decoded) separately to obtain a corresponding decoded subpacket. The t decoded subpackets may then be assembled to obtain a decoded packet.

The t subpackets may be mapped to the $N_{TILES}$ tiles in various manners. In one design, the packet may be modulated on to the hop-ports assigned to this packet according to the following procedure:

1. Initialize a port counter i to 0, a frame counter f to 0, and an OFDM symbol counter j to 0.
2. Arrange the set of usable hop-ports assigned to this packet in the f-th PHY frame of transmission, e.g., in increasing order. Let the resulting sequence be denoted by $p_0, p_1, \ldots, p_{n-1}$, where n is the total number of hop-ports assigned to this packet in the f-th PHY frame of transmission.
3. Let $n_{sc}$ be the subcarrier index corresponding to hop-port $p_i$ in the j-th OFDM symbol of the f-th PHY frame of transmission. Let q be the modulation order to be used for the f-th PHY frame of transmission, which is a function of a packet format. If $n_{sc}$ is available for transmission, then a modulation symbol s with modulation order q is generated from subpacket m by a modulator, where m may be equal to:

$m = (i_{TILE} + (j+i \bmod N_{BLOCK}) \bmod N_{SUBPACKETS-IN-TILE}) \bmod t),$ Eq(3)

where t is the total number of subpackets in the packet, $N_{BLOCK}$ is the number of hop-ports in a tile, $i_{TILE}$ is a tile index and given as $i_{TILE} = \lfloor i/N_{BLOCK} \rfloor$, and $N_{SUBPACKETS-IN-TILE}$ is the number of subpackets in a tile.

$N_{SUBPACKETS-IN-TILE}$ may be computed as follows:

$$a. \ N_{SUBPACKETS-IN-TILE} = t \quad \text{Eq (4)}$$

if $i_{TILE} < (N_{TILES} \bmod t)$, where $N_{TILE} = \lfloor n/N_{BLOCK} \rfloor$, and $$b. \ N_{SUBPACKETS-IN-TILE} = \min\left(t, \left\lceil \frac{N_{MIN} t}{N_{TILES} - (N_{TILES} \bmod t)} \right\rceil\right) \quad \text{Eq (5)}$$

otherwise.

4. Modulation symbol s may be modulated with power density P on hop-port $p_i$, and the value of the corresponding subcarrier may be $\sqrt{Ps}$. P may be the power density used for this assignment in the f-th PHY frame of transmission. The modulation may be done on an antenna with index k if $i_{TILE}$ is a DRCH resource in the SymbolRateHopping mode and on a tile-antenna with index k if $i_{TILE}$ is a BRCH resource in the BlockHopping mode. In the SymbolRateHopping mode, the power density P may be constant over all hop-ports assigned to the packet. In the BlockHopping mode, different values of power density P may be used for BRCH resources.
5. Increment i. If i=n, increment j and set i=0.
6. If j=$N_{FRAME}$, set j=0 and increment f.
7. If the last PHY frame of transmission has been completed, then stop. Else repeat steps 2 through 6.

In the design described above, equations (4) and (5) determine the number of subpackets in each tile, and equation (3) determines which subpacket is sent on each hop-port in each tile. In another design, the number of subpackets in each tile may be determined as follows:

$$N_{SUBPACKETS-IN-TILE} = t \ \text{if} \ N_{TILES} < N_{MIN}, \quad \text{Eq (6)}$$

$$N_{SUBPACKETS-IN-TILE} = \left\lfloor \frac{N_{MIN} t}{N_{TILES}} \right\rfloor \quad \text{Eq (7)}$$

if $i_{TILE} \geq ((N_{MIN} t) \bmod N_{TILES})$ and $N_{MIN} \leq N_{TILES} < N_{MIN} t$, or $$N_{SUBPACKETS-IN-TILE} = \left\lceil \frac{N_{MIN} t}{N_{TILES}} \right\rceil \text{otherwise.} \quad \text{Eq (8)}$$

The subpackets may also be mapped to tiles and hop-ports based on other equations. In general, each subpacket may be mapped to all or a subset of the $N_{TILES}$ tiles assigned to the packet, and each tile may carry all or a subset of the t subpackets.

The subpacket-to-tile mapping in equations (3) through (5) may be illustrated with a specific example. In this example, t=3 subpackets are sent in $N_{TILES}$=8 tiles, with $N_{MIN}$=4.

Figure 4:
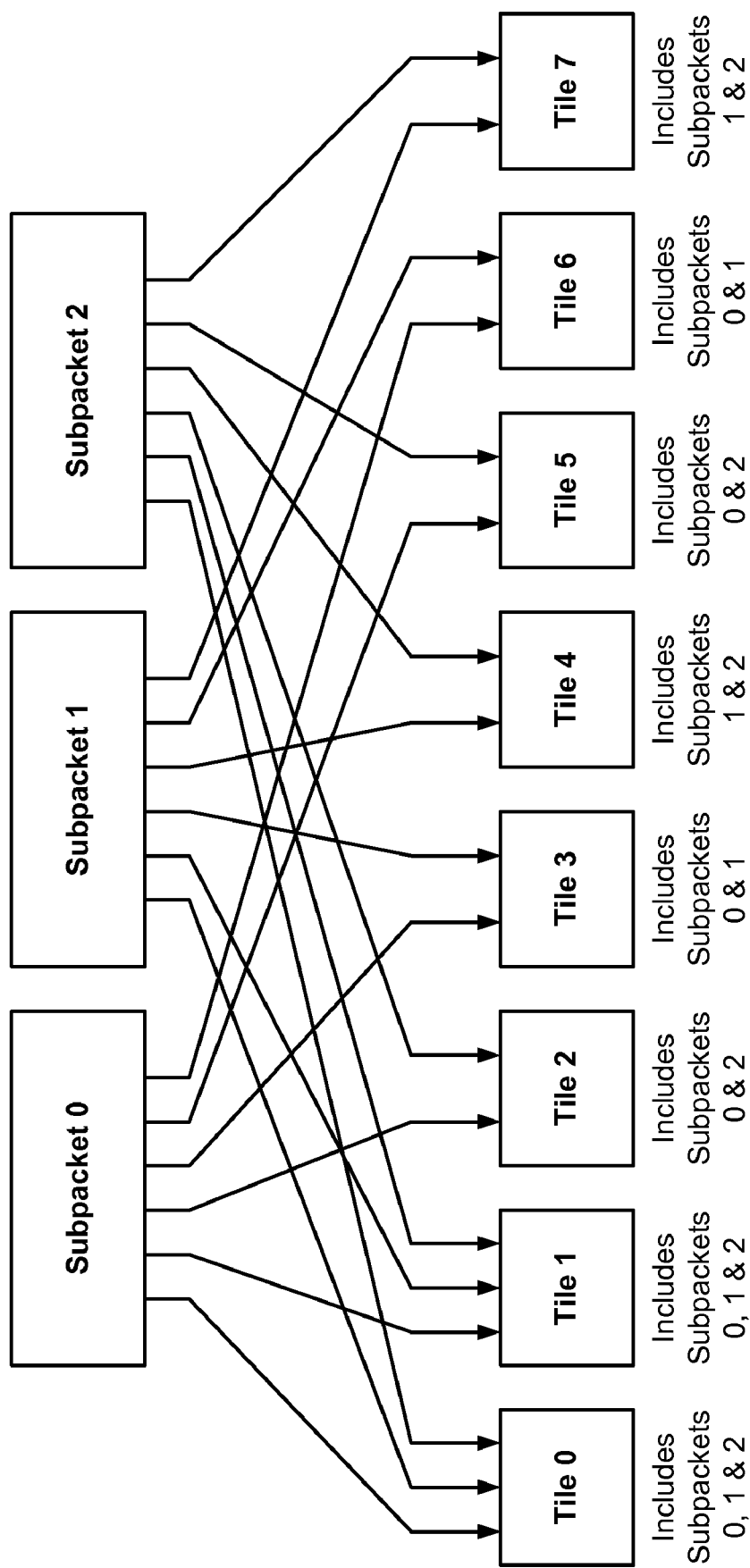
FIG. 4 shows mapping of three subpackets to eight tiles.

FIG. 4 shows a mapping of three subpackets 0, 1 and 2 to eight tiles 0 through 7 based on the design with equations (3) through (5). In this example, ($N_{TILES}$ mod t) is equal to 2, and the first two tiles 0 and 1 each includes all three subpackets in the tile, as shown in equation (4). Each remaining tile includes $$\min\left(3, \left\lceil \frac{4*3}{8-(8 \bmod 3)} \right\rceil\right) = 2$$

subpackets, as shown in equation (5).

For each of the first two tiles 0 and 1, $N_{SUBPACKETS-IN-TILE}=3$, and the term $(j+i \bmod N_{BLOCK}) \bmod 3$ in equation (3) can take on values of 0, 1 and 2 as OFDM symbol counter j and port counter i are incremented. Hence, all three subpackets are mapped to each of tiles 0 and 1, as shown in FIG. 4.

For each of the six remaining tiles 2 through 7, $N_{SUBPACKETS-IN-TILE}=2$, and the term $(j+i \bmod N_{BLOCK}) \bmod 2$ in equation (3) can take on values of 0 and 1 as OFDM symbol counter j and port counter i are incremented. Hence, only two subpackets are mapped to each of tiles 2 through 7. In particular, subpackets ($i_{TILE} \bmod 3$) and (($i_{TILE}+1) \bmod 3$) are mapped to tile $i_{TILE}$. Thus, subpackets 0 and 2 are mapped to tile 2, subpackets 0 and 1 are mapped to tile 3, subpackets 1 and 2 are mapped to tile 4, etc., as shown in FIG. 4.

In the design shown in equations (4) and (5), the $N_{TILES}$ tiles are arranged into a first group of $N_1=M*t$ tiles and a second group of $N_2=N_{TILES}-N_1$ tiles, where $M \geq 0$, $N_1$ is an integer multiple of t, and $0 \leq N_2 < t$. The first group includes an integer multiple of t tiles, and the second group includes zero or more remaining tiles. Each subpacket is mapped to the smaller of $N_{MIN}$ or $N_1$ tiles in the first group. The smaller of t or $\lceil N_{MIN}/M \rceil$ subpackets are mapped to each tile in the first group. All t subpackets are mapped to each tile in the second group. Each of the t subpackets is mapped to the same number of tiles regardless of the values of t and $N_{TILES}$.

In the example shown in FIG. 4, $N_{TILES}=8$, $N_{MIN}=4$, $N_1=6$, $N_2=2$ and M=2. The first group includes $N_1=6$ tiles, and the second group includes $N_2=2$ tiles. Since $N_{MIN}<N_1$, each subpacket is mapped to $N_{MIN}=4$ tiles in the first group. Furthermore, since $\lceil N_{MIN}/M \rceil < t$, $\lceil N_{MIN}/M \rceil=2$ subpackets are mapped to each tile in the first group. All 3 subpackets are mapped to each tile in the second group.

In the design shown in equations (4) and (5), each subpacket is mapped to the smaller of $N_2+N_{MIN}$ or $N_{TILES}$ tiles, where $N_2$ is dependent on the values of $N_{TILES}$ and t. In another design, each subpacket is mapped to the smaller of $N_{MIN}$ or $N_{TILES}$ tiles. This may be achieved, e.g., with the design shown in equations (6) through (8).

As shown in FIG. 4, a given subpacket may be sent on a subset of the $N_{TILES}$ tiles, without fully using all of the assigned resources. Sending the subpacket in this manner may allow for pipelining of the demodulation and decoding tasks at the receiver and may improve decoding latency. For the example shown in FIG. 4, the receiver may perform demodulation for tiles 0, 1, 2, 3, 5 and 6 in order to obtain detected symbols for subpacket 0. The receiver may then perform decoding for subpacket 0 while concurrently performing demodulation for the remaining two tiles 4 and 7. The receiver may then perform decoding for each of subpackets 1 and 2. In general, the amount of pipelining may be dependent on the number of tiles in which each subpacket is sent, e.g., small $N_{MIN}$ and/or large $N_{TILES}$ may result in greater pipelining. $N_{MIN}$ may be selected to achieve the desired diversity for each subpacket and may be equal to 4, 8, 16, or some other value.

FIG. 5 shows a design of a tile. In this design, a tile covers 16 hop-ports in 8 OFDM symbol periods and includes 128 transmission units. A transmission unit may also be referred to as a resource element, may correspond to one subcarrier in one OFDM symbol period, and may be used to send one symbol on each layer available for transmission. Pilot symbols may be sent on some of the transmission units in the tile, and other symbols may be sent on the remaining transmission units in the tile.

FIG. 5 also illustrates the mapping of subpackets to transmission units in one tile based on equation (3). For the first tile with $i_{TILE}=0$, counters i and j are both initialized to 0. For the first OFDM symbol period with j=0, subpacket 0 is mapped to hop-port 0, subpacket 1 is mapped to hop-port 1, subpacket 2 is mapped to hop-port 2, subpacket 0 is mapped to hop-port 3, etc. For the second OFDM symbol period with j=1, subpacket 1 is mapped to hop-port 0, subpacket 2 is mapped to hop-port 1, subpacket 0 is mapped to hop-port 2, subpacket 1 is mapped to hop-port 3, etc. For the third OFDM symbol period with j=2, subpacket 2 is mapped to hop-port 0, subpacket 0 is mapped to hop-port 1, subpacket 1 is mapped to hop-port 2, subpacket 2 is mapped to hop-port 3, etc.

The design shown in equation (3) traverses through the hop-ports in each OFDM symbol period and also cycles through the $N_{SUBPACKETS-IN-TILE}$ subpackets and maps one subpacket to each hop-port. Different starting subpackets are used in different OFDM symbol periods. If only one subpacket is mapped to a given tile, then $N_{SUBPACKETS-IN-TILE}=1$, the term (($j+i \bmod N_{BLOCK}$) $\bmod N_{SUBPACKETS-IN-TILE}$) in equation (3) is equal to 0 for all values of j and i, and same subpacket with index $i_{TILE}$ is mapped to all hop-ports and OFDM symbol periods in the tile.

Several designs of subpacket-to-tile mapping have been described above. The t subpackets may also be mapped to the $N_{TILES}$ tiles and transmission units in other manners based on other equations to achieve one or more of the mapping characteristics described above.

Figure 6:
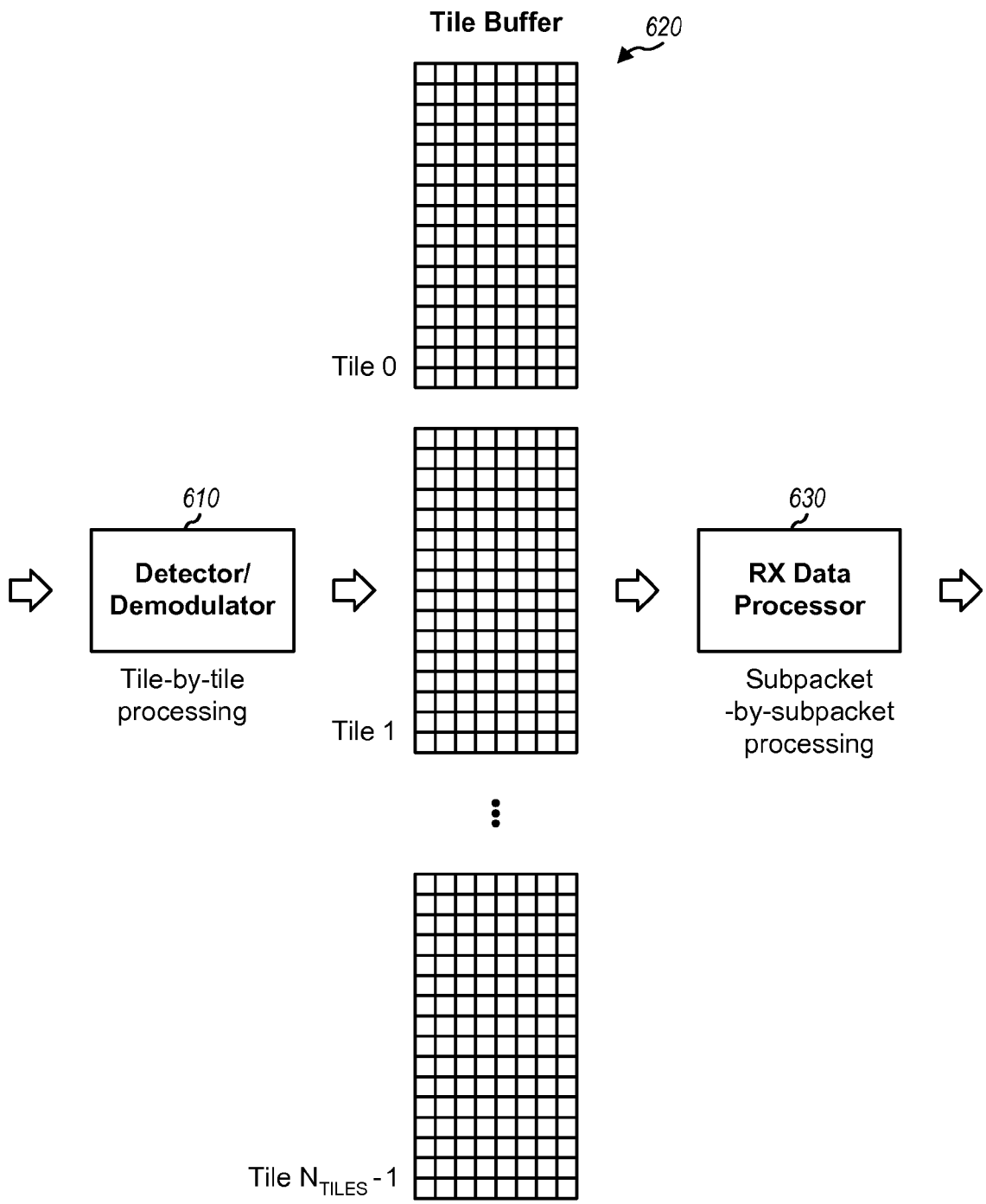
FIG. 6 shows processing of the packet at a receiver.

FIG. 6 shows a design of the processing at the receiver. The receiver may obtain received symbols for all $N_{TILES}$ tiles used for the packet sent by the transmitter. A detector/demodulator 610 may perform detection/demodulation for each tile based on the received symbols in that tile. For example, detector/demodulator 610 may derive a channel estimate based on received pilot symbols and then perform detection on received data symbols based on the channel estimate to obtain detected symbols for the tile. Detector 610 may store the detected symbols for each tile in a respective section of a tile buffer 620.

An RX data processor 630 may perform decoding for each subpacket whenever all tiles for that subpacket have been demodulated. RX data processor 630 may retrieve the detected symbols for a subpacket from the proper sections of tile buffer 620 and may process the detected symbols to obtain a corresponding decoded subpacket. Detector 610 may perform detection on a tile-by-tile basis, and RX data processor 630 may perform decoding on a subpacket-by-subpacket basis.

Tile buffer 620 may allow for decoupling of the operation of detector 610 and RX data processor 630 and may also allow for pipelining of these two units. Detector 610 may perform detection for all tiles used for subpacket 0 and store the detected symbols in tile buffer 620. RX data processor 630 may then perform decoding for subpacket 0 while detector 610 performs detection for remaining tiles used for subpacket 1. The pipelining may continue until all $N_{TILES}$ tiles have been detected and all t subpackets have been decoded.

The techniques described herein may be used for traffic data, signaling, erasure sequences, etc. Signaling is also referred to as control information, control data, overhead data, etc. An erasure sequence is a sequence transmitted on a channel to hold it in the absence of data. The techniques may also be used for unicast data sent to a specific receiver, multicast data sent to a group of receivers, and broadcast data sent to all receivers. The techniques may be used for a data channel on the forward link, a data channel on the reverse link, a broadcast channel, a multicast channel, a superposed channel, etc. Unicast data may be sent in a broadcast segment on the superposed channel.

The techniques may also be used for a multiple-input multiple-output (MIMO) transmission from multiple antennas at the transmitter to multiple antennas at the receiver as well as non-MIMO transmissions. A single modulation symbol may be sent on one transmission unit in one layer for a non-MIMO transmission. Multiple modulation symbols may be sent on one transmission unit in multiple layers for a MIMO transmission. In general, one or more modulation symbols may be generated for each transmission unit (or each hop-port of each OFDM symbol period) based on the subpacket mapped to that transmission unit. A sufficient number of bits from the subpacket may be used to generate the desired number of modulation symbols.

Figure 7:
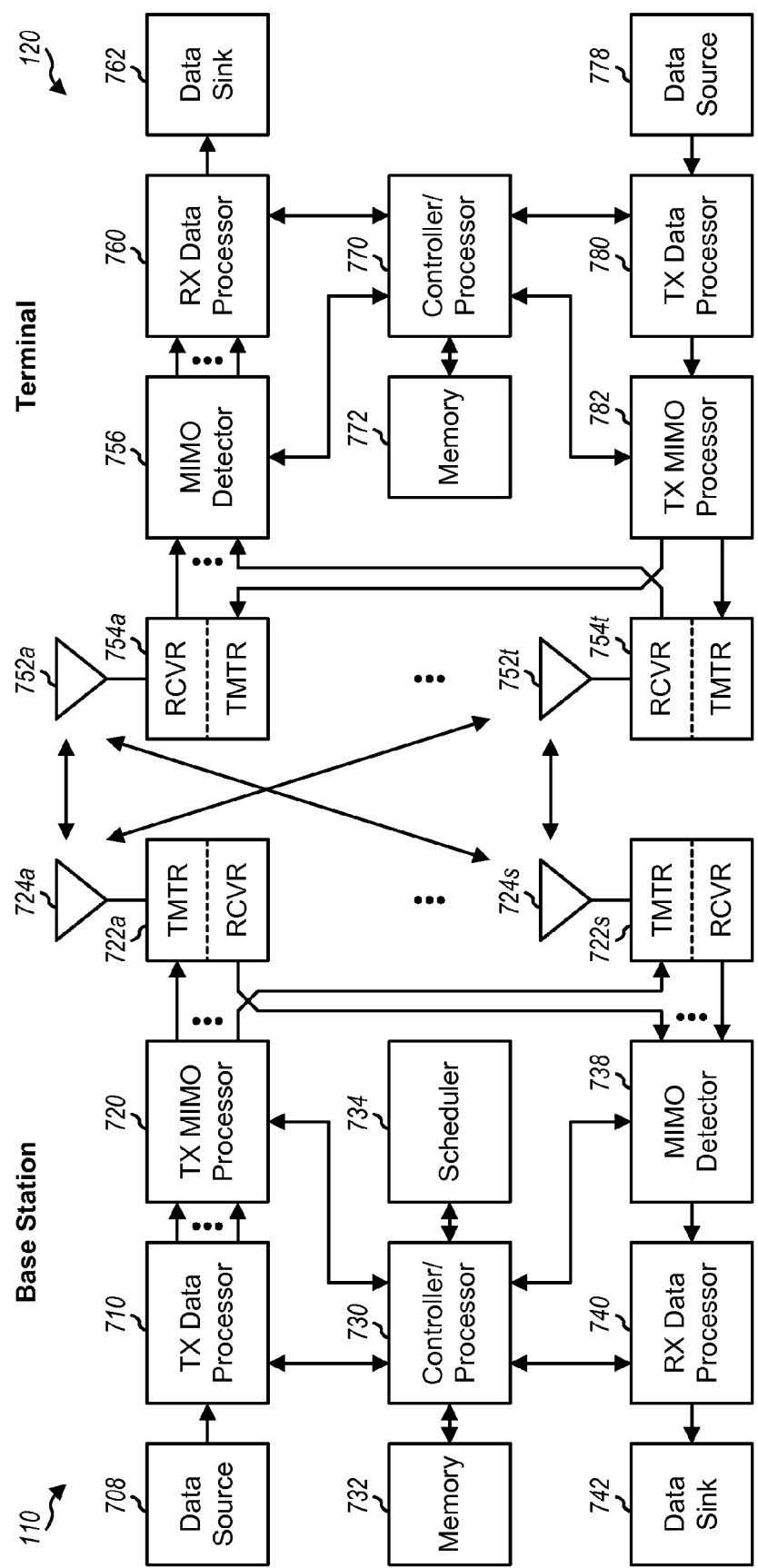
FIG. 7 shows a block diagram of a base station and a terminal.

FIG. 7 shows a block diagram of a design of base station 110 and terminal 120 in FIG. 1. In this design, base station 110 is equipped with S antennas 724a through 724s, and terminal 120 is equipped with T antennas 752a through 752t, where in general $S \geq 1$ and $T \geq 1$.

On the forward link, at base station 110, a TX data processor 710 may receive a packet of data for terminal 120 from a data source 708 and may partition the packet into multiple subpackets. TX data processor 710 may then process (e.g., encode, interleave, and symbol map) each subpacket to obtain a corresponding output subpacket and may map the multiple output subpackets to the tiles assigned for transmission of the packet. A TX MIMO processor 720 may multiplex the modulation symbols in the output subpackets with pilot symbols, perform direct MIMO mapping or precoding/beamforming if applicable, and provide S output symbol streams to S transmitters (TMTR) 722a through 722s. Each transmitter 722 may process its output symbol stream (e.g., for OFDM) to obtain an output chip stream. Each transmitter 722 may further condition (e.g., convert to analog, filter, amplify, and upconvert) its output chip stream and generate a forward link signal. S forward link signals from transmitters 722a through 722s may be transmitted from S antennas 724a through 724s, respectively.

At terminal 120, T antennas 752a through 752t may receive the forward link signals from base station 110, and each antenna 752 may provide a received signal to a respective receiver (RCVR) 754. Each receiver 754 may condition (e.g., filter, amplify, downconvert, and digitize) its received signal to obtain samples, process the samples (e.g., for OFDM) to obtain received symbols, and provide the received symbols to a MIMO detector 756. MIMO detector 756 may perform MIMO detection on the received symbols, if applicable, and provide detected symbols for the assigned tiles. An RX data processor 760 may demap the subpackets from the assigned tiles, process (e.g., symbol demap, deinterleave, and decode) each subpacket, and provide a decoded packet to a data sink 762. In general, the processing by MIMO detector 756 and RX data processor 760 is complementary to the processing by TX MIMO processor 720 and TX data processor 710 at base station 110.

On the reverse link, at terminal 120, a TX data processor 780 may receive a packet from data source 778, partition the packet into subpackets, process each subpacket to obtain an output subpacket, and map the output subpackets for the packet to tiles assigned for transmission of the packet. The output subpackets from TX data processor 780 may be multiplexed with pilot symbols and spatially processed by a TX MIMO processor 782, and further processed by transmitters 754a through 754t to obtain T reverse link signals, which may be transmitted via antennas 752a through 752t. At base station 110, the reverse link signals from terminal 120 may be received by antennas 724a through 724s, processed by receivers 722a through 722s, detected by a MIMO detector 738, and further processed by an RX data processor 740 to recover the packet transmitted by terminal 120.

Controllers/processors 730 and 770 may direct the operation at base station 110 and terminal 120, respectively. Memories 732 and 772 may store data and program codes for base station 110 and terminal 120, respectively. A scheduler 734 may schedule terminal 120 for data transmission on the forward and/or reverse link and may assign resources, e.g., tiles, for the data transmission.

Figure 8:
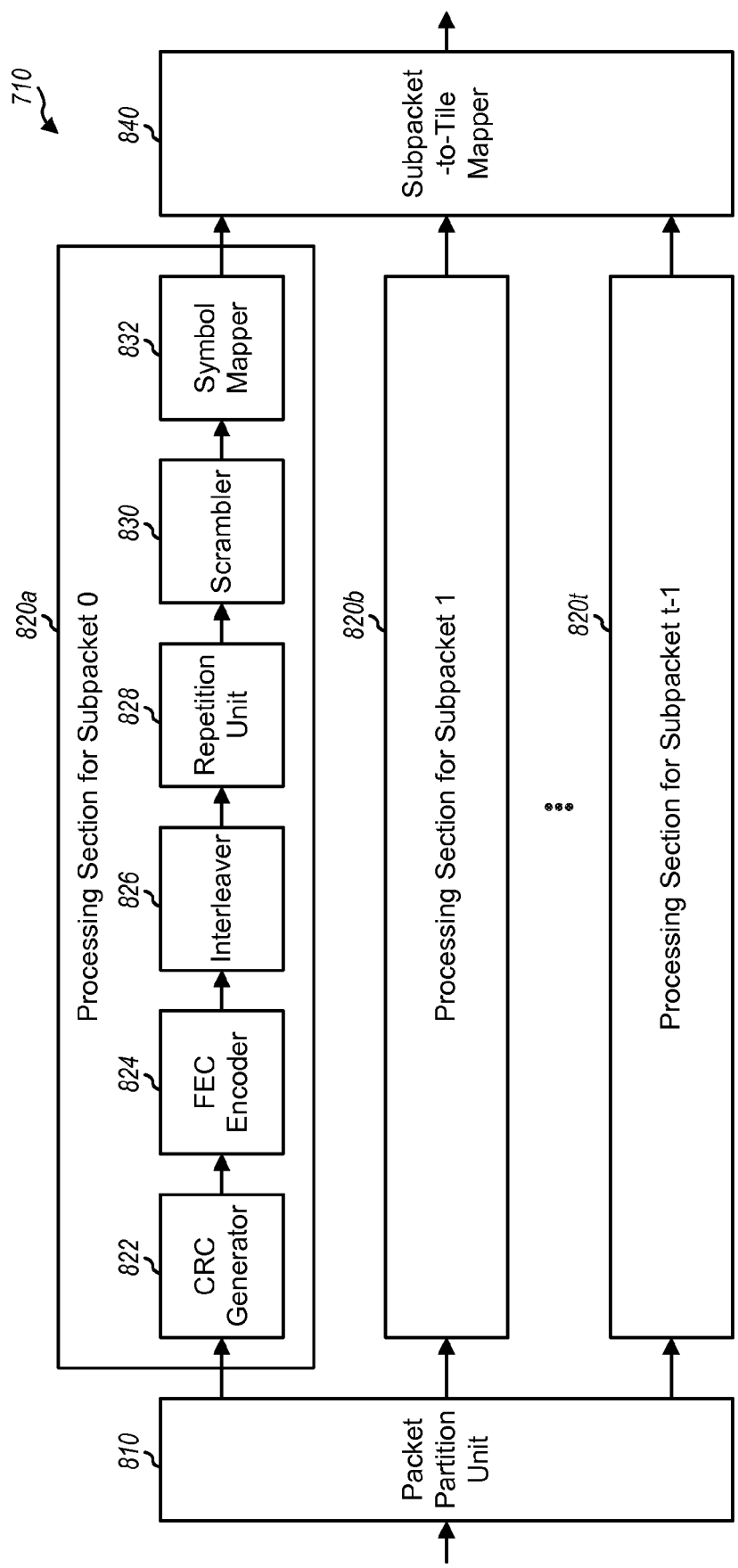
FIG. 8 shows a block diagram of a transmit (TX) data processor.

FIG. 8 shows a block diagram of a design of TX data processor 710, which may also be used for TX data processor 780 in FIG. 7. Within TX data processor 710, a packet partitioning unit 810 may receive a packet for transmission, partition the packet into t subpackets, e.g., as shown in equation (2), and provide the t subpackets to t processing sections 820a through 820t.

Within processing section 820a for subpacket 0, a CRC generator 822 may generate a CRC for the subpacket and provide a formatted subpacket having the CRC appended to the subpacket. A forward error correction (FEC) encoder 824 may receive the formatted subpacket, encode the subpacket in accordance with an FEC code, and provide a coded subpacket. The FEC code may comprise a Turbo code, a convolutional code, a low density parity check (LDPC) code, a block code, etc. An interleaver 826 may interleave or reorder the bits in the coded subpacket based on an interleaving scheme. A repetition unit 828 may repeat the bits from interleaver 826, if necessary, to obtain the desired total number of bits. A scrambler 830 may scramble the bits from unit 828 to randomize the data. Scrambler 830 may generate a scrambling sequence based on a linear feedback shift register (LFSR), which may be initialized at the start of the subpacket with a seed value determined based on a MAC ID of terminal 120, a sector ID or pilot phase of a serving sector/base station, a packet format index for the packet, a frame index of the first PHY frame in which the packet is sent, and/or some other parameter. A symbol mapper 832 may map the scrambled bits to modulation symbols based on a selected modulation scheme such as QPSK, 16-QAM, 64-QAM, etc. Symbol mapper 832 may provide an output subpacket of modulation symbols. Each remaining processing section 820 may similarly process its subpacket and provide a corresponding output subpacket of modulation symbols.

A subpacket-to-tile mapper 840 may receive all t output subpackets from processing sections 820a through 820t. Mapper 840 may map each subpacket to all of a subset of the $N_{TILES}$ tiles assigned for the packet. For each tile, mapper 840 may determine at least one subpacket mapped to that tile and may map the modulation symbols in the at least one subpacket to the proper hop-ports and OFDM symbol periods in the tile, e.g., as shown in equation (3) and FIG. 5.

Figure 9:
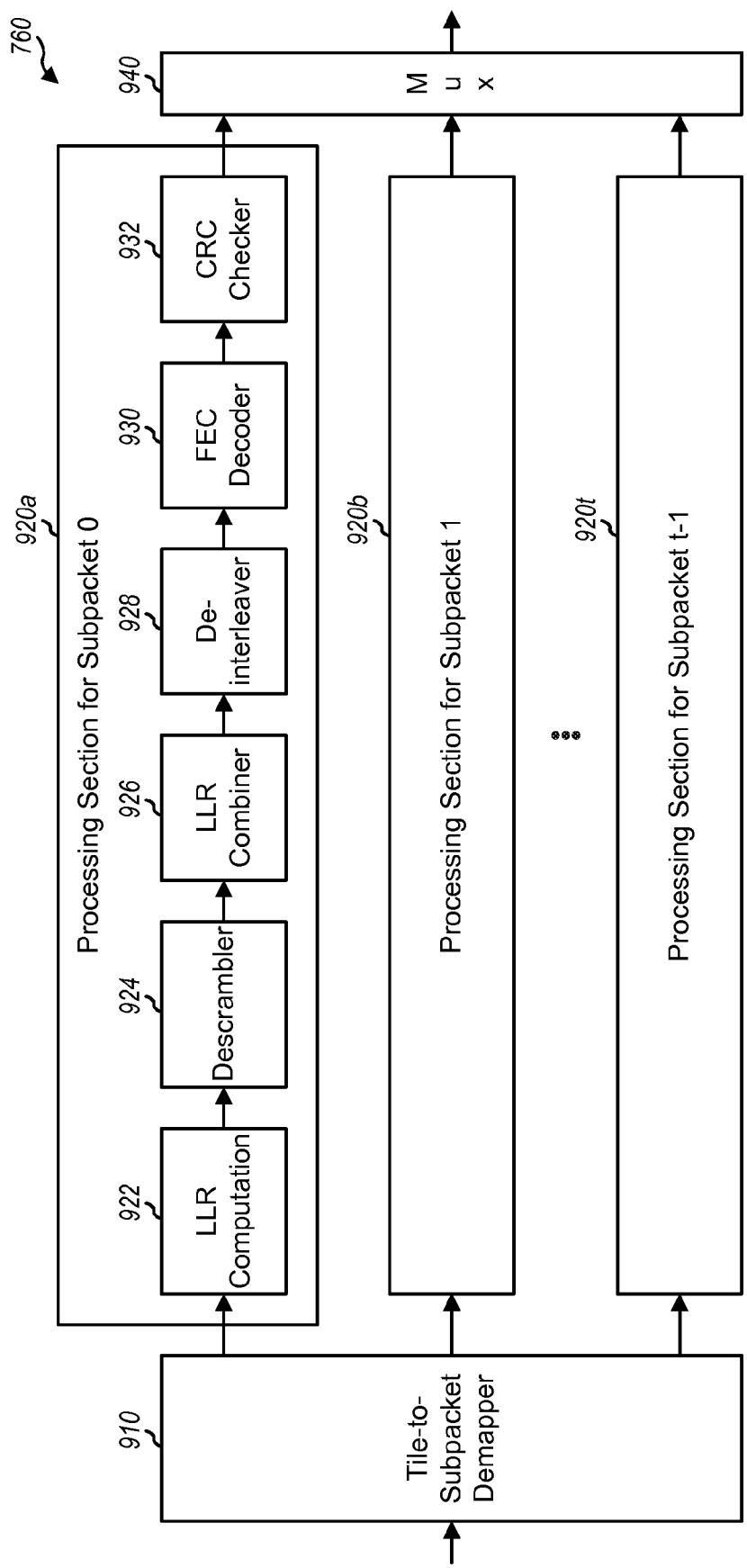
FIG. 9 shows a block diagram of a receive (RX) data processor.

FIG. 9 shows a block diagram of a design of RX data processor 760, which may also be used for RX data processor 740 in FIG. 7. Within RX data processor 760, a tile-to-subpacket demapper 910 may receive detected symbols for the $N_{TILES}$ tiles used for a packet, perform demapping from tiles to subpackets, and provide the detected symbols for the t subpackets to t processing sections 920a through 920t.

Within processing section 920a for subpacket 0, a log-likelihood ratio (LLR) computation unit 922 may receive the detected symbols for subpacket 0 and may compute LLRs for code bits for this subpacket based on the detected symbols.

The LLR for each code bit may indicate the likelihood of that code bit being zero ('0') or one ('1') given the detected symbol for the code bit. A descrambler 924 may descramble the LLRs based on the scrambling sequence used for the subpacket. An LLR combiner 926 may combine LLRs for repeated code bits, which may have been sent in later HARQ transmissions. A deinterleaver 928 may deinterleave the LLRs from unit 926 in a manner complementary to the interleaving by interleaver 826 in FIG. 8. An FEC decoder 930 may decode the deinterleaved LLRs in accordance with an FEC code used for the subpacket and provide a decoded subpacket. A CRC checker 932 may check the decoded subpacket and provide decoding status for the subpacket. Each remaining processing section 920 may similarly process its subpacket and provide a corresponding decoded subpacket.

A multiplexer (Mux) 940 may assemble all t decoded subpackets from processing sections 920a through 920t and provide a decoded packet. In one design, an acknowledgement (ACK) may be sent for each subpacket decoded correctly. All t subpackets may be acknowledged together. The subpackets decoded in error may be resent in a subsequent HARQ transmission.

Figures 10, 11:
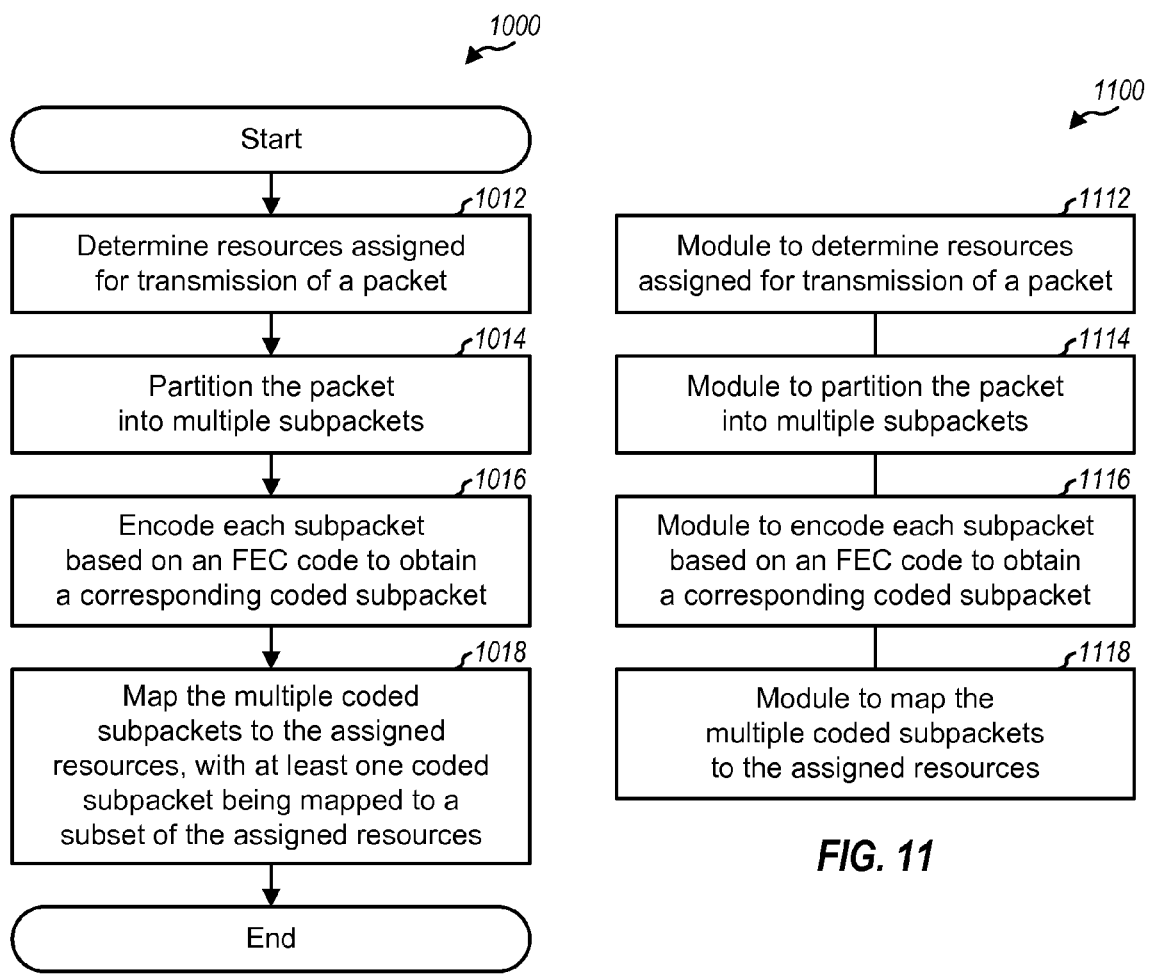
FIG. 10 shows a process for transmitting data.
FIG. 11 shows an apparatus for transmitting data.

FIG. 10 shows a design of a process 1000 for transmitting data. Process 1000 may be performed by a transmitter, which may be a base station for a forward link transmission or a terminal for a reverse link transmission. Resources assigned for transmission of a packet may be determined (block 1012). The packet may be partitioned into multiple subpackets (block 1014). Each subpacket may be encoded based on an FEC code to obtain a corresponding coded subpacket (block 1016). The multiple coded subpackets may be mapped to the assigned resources, with at least one coded subpacket being mapped to a subset of the assigned resources (block 1018).

The assigned resources may include multiple tiles. For block 1018, each subpacket may be mapped to (i) a different subset of the multiple tiles, (ii) a particular minimum number of tiles, (iii) all of the multiple tiles if fewer than the particular minimum number of tiles, (iv) an equal number of tiles, or (v) a combination thereof. The multiple tiles may be arranged into a first group of an integer multiple of t tiles and a second group of remaining tiles, where t is the number of subpackets. A subset of the t subpackets may be mapped to each tile in the first group, and all of the t subpackets may be mapped to each tile in the second group. For each tile, at least one subpacket mapped to that tile may be determined and may be distributed across the tile, e.g., by cycling through the at least one subpacket and mapping one subpacket to each available transmission unit in the tile.

FIG. 11 shows a design of an apparatus 1100 for transmitting data. Apparatus 1100 includes means for determining resources assigned for transmission of a packet (module 1112), means for partitioning the packet into multiple subpackets (module 1114), means for encoding each subpacket based on an FEC code to obtain a corresponding coded subpacket (module 1116), and means for mapping the multiple coded subpackets to the assigned resources, with at least one coded subpacket being mapped to a subset of the assigned resources (module 1118).

Figure 12:
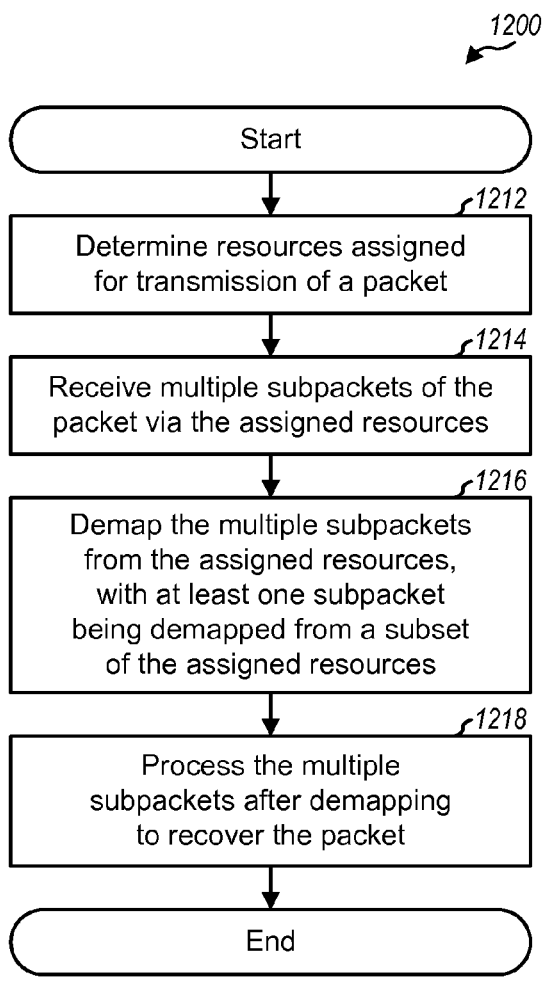
FIG. 12 shows a process for receiving data.

FIG. 12 shows a design of a process 1200 for receiving data. Process 1200 may be performed by a receiver, which may be a terminal for a forward link transmission or a base station for a reverse link transmission. Resources assigned for transmission of a packet may be determined (block 1212). Multiple subpackets of the packet may be received via the assigned resources (block 1214). The multiple subpackets may be demapped from the assigned resources, with at least one subpacket being demapped from a subset of the assigned resources (block 1216). The multiple subpackets may be processed after demapping to recover the packet (block 1218).

The assigned resources may include multiple tiles. For block 1216, each subpacket may be demapped from (i) a different subset of the multiple tiles, (ii) a particular minimum number of tiles, (iii) all of the multiple tiles if fewer than the particular minimum number of tiles, (iv) an equal number of tiles, or (v) a combination thereof. For each tile, at least one subpacket mapped to that tile may be determined and may be demapped from across the tile.

For block 1218, demodulation may be performed for each tile, e.g., on a tile-by-tile basis. Decoding may be performed for each subpacket when all tiles to which the subpacket is mapped have been demodulated, without waiting for all of the assigned tiles to be demodulated. Each subpacket may be decoded based on an FEC code to obtain a corresponding decoded subpacket.

Figure 13:
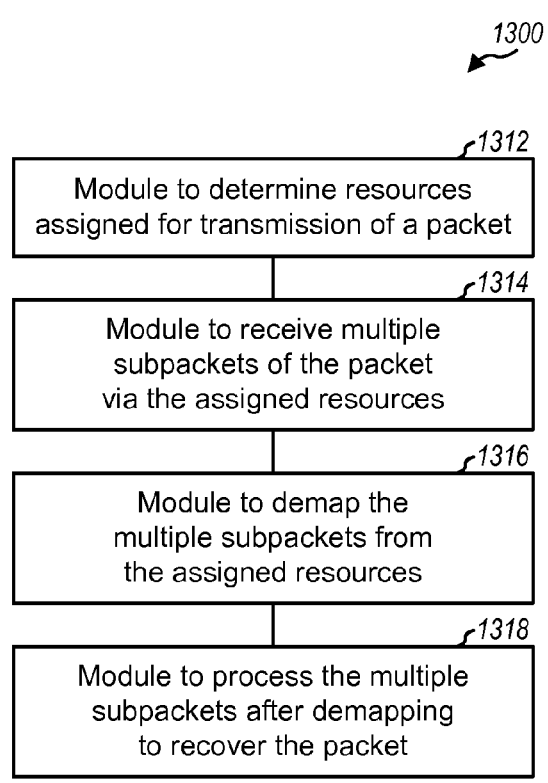
FIG. 13 shows an apparatus for receiving data.

FIG. 13 shows a design of an apparatus 1300 for receiving data. Apparatus 1300 includes means for determining resources assigned for transmission of a packet (module 1312), means for receiving multiple subpackets of the packet via the assigned resources (module 1314), means for demapping the multiple subpackets from the assigned resources, with at least one subpacket being demapped from a subset of the assigned resources (module 1316), and means for processing the multiple subpackets after demapping to recover the packet (module 1318).

The modules in FIGS. 11 and 13 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof For a hardware implementation, the processing units used to perform the techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 732 or 772 in FIG. 2) and executed by a processor (e.g., processor 730 or 770). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for communication, comprising:
at least one processor configured to determine resources assigned for transmission of a packet, to partition the packet into multiple subpackets, and to map the multiple subpackets to the assigned resources, with at least one subpacket being mapped to a subset of the assigned resources; and
a memory coupled to the at least one processor;
wherein the assigned resources comprise multiple tiles, each tile corresponding to a block of time frequency resources; and
wherein the at least one processor is configured to arrange the multiple tiles into a first group of at least two tiles and a second group of remaining tiles, to map a subset of the multiple subpackets to each tile in the second group, and to map all of the multiple subpackets to each tile in the first group.

2. The apparatus of claim 1, wherein the at least one processor is configured to encode each subpacket based on a forward error correction (FEC) code to obtain a corresponding coded subpacket.

3. The apparatus of claim 1, wherein each tile corresponds to a block of contiguous time frequency resources.

4. The apparatus of claim 3, wherein the at least one processor is configured to map each of the multiple subpackets to a particular minimum number of tiles greater than one or to all of the multiple tiles if fewer than the particular minimum number of tiles are available.

5. The apparatus of claim 1, wherein the tiles correspond to blocks of time frequency resources distributed across system bandwidth.

6. The apparatus of claim 1, wherein the at least one processor is configured to map each of the multiple subpackets to a different subset of the multiple tiles.

7. The apparatus of claim 1, wherein the at least one processor is configured to map each of the multiple subpackets to an equal number of tiles greater than one.

8. The apparatus of claim 1, wherein the first group includes an integer multiple of t tiles, where t is the number of subpackets.

9. The apparatus of claim 1, wherein the at least one processor is configured to determine a plurality of subpackets mapped to one of the tiles and to distribute a portion of each of the plurality of subpackets across the one tile.

10. The apparatus of claim 1, wherein for each of the multiple tiles the at least one processor is configured to distribute the at least one subpacket across the one tile by cycling through the at least one subpacket and mapping one subpacket to each available transmission unit in the one tile.

11. A method of transmitting data, comprising:
determining resources assigned for transmission of a packet;
partitioning the packet into multiple subpackets; and
mapping the multiple subpackets to the assigned resources, with at least one subpacket being mapped to a subset of the assigned resources;
wherein the assigned resources comprise multiple tiles, and wherein the mapping the multiple subpackets comprises:
arranging the multiple tiles into a first group of an integer multiple of t tiles and a second group of remaining tiles, where t is the number of subpackets,
mapping a subset of the multiple subpackets to each tile in the second group, and
mapping all of the multiple subpackets to each tile in the first group.

12. The method of claim 11, further comprising:
encoding each subpacket based on a forward error correction (FEC) code to obtain a corresponding coded subpacket.

13. The method of claim 11, wherein the mapping the multiple subpackets comprises
mapping each of the multiple subpackets to at least one of a different subset of the multiple tiles, an equal number of tiles, a particular minimum number of tiles, and all of the multiple tiles if fewer than the particular minimum number of tiles.

14. An apparatus for communication, comprising:
means for determining resources assigned for transmission of a packet;
means for partitioning the packet into multiple subpackets; and
means for mapping the multiple subpackets to the assigned resources, with at least one subpacket being mapped to a subset of the assigned resources;
wherein the assigned resources comprise multiple tiles, and wherein the means for mapping the multiple subpackets comprises
means for arranging the multiple tiles into a first group of an integer multiple of t tiles and a second group of remaining tiles, where t is the number of subpackets,
means for mapping a subset of the multiple subpackets to each tile in the second group, and
means for mapping all of the multiple subpackets to each tile in the first group.

15. The apparatus of claim 14, further comprising:
means for encoding each subpacket based on a forward error correction (FEC) code to obtain a corresponding coded subpacket.

16. The apparatus of claim 14, wherein the means for mapping the multiple subpackets comprises
means for mapping each of the multiple subpackets to at least one of a different subset of the multiple tiles, an equal number of tiles, a particular minimum number of tiles, and all of the multiple tiles if fewer than the particular minimum number of tiles.

17. A computer program product, comprising:
a non-transitory computer-readable medium comprising:
code for causing at least one computer to determine resources assigned for transmission of a packet, wherein the assigned resources comprise multiple tiles, each tile corresponding to a block of time frequency resources;
code for causing the at least one computer to partition the packet into multiple subpackets;
code for causing the at least one computer to map the multiple subpackets to the assigned resources, with at least one subpacket being mapped to a subset of the assigned resources; and
code for causing the at least one computer to arrange the multiple tiles into a first group of at least two tiles and a second group of remaining tiles;

code for causing the at least one computer to map a subset of the multiple subpackets to each tile in the second group; and code for causing the at least one computer to map all of the multiple subpackets to each tile in the first group.

18. An apparatus for communication, comprising:
at least one processor configured to determine resources assigned for transmission of a packet, to receive multiple subpackets of the packet via the assigned resources, to demap the multiple subpackets from the assigned resources, with at least one subpacket being demapped from a subset of the assigned resources, and to process the multiple subpackets after demapping to recover the packet; and
a memory coupled to the at least one processors;
wherein the assigned resources comprise multiple tiles, each tile corresponding to a block of time frequency resources; and
wherein the at least one processor is configured to perform demodulation for each of the multiple tiles and to perform decoding for each of the multiple subpackets when all tiles to which the subpacket is mapped have been demodulated without waiting for all of the multiple tiles to be demodulated.

19. The apparatus of claim 18, wherein the at least one processor is configured to decode each subpacket based on a forward error correction (FEC) code to obtain a corresponding decoded subpacket.

20. The apparatus of claim 18, wherein the at least one processor is configured to demap each of the multiple subpackets from a different subset of the multiple tiles.

21. The apparatus of claim 18, wherein the at least one processor is configured to demap each of the multiple subpackets from a particular minimum number of tiles or from all of the multiple tiles if fewer than the particular minimum number of tiles.

22. The apparatus of claim 18, wherein the at least one processor is configured to demap each of the multiple subpackets from an equal number of tiles.

23. The apparatus of claim 18, wherein for each of the multiple tiles the at least one processor is configured to determine at least one subpacket mapped to the tile and to demap the at least one subpacket from across the tile.

24. A method of receiving data, comprising:
determining resources assigned for transmission of a packet;
receiving multiple subpackets of the packet via the assigned resources;
demapping the multiple subpackets from the assigned resources, with at least one subpacket being demapped from a subset of the assigned resources; and
processing the multiple subpackets after demapping to recover the packet;
wherein the assigned resources comprise multiple tiles, and wherein the processing the multiple subpackets comprises:
performing demodulation for each of the multiple tiles, and
performing decoding for each of the multiple subpackets when all tiles to which the subpacket is mapped have been demodulated without waiting for all of the multiple tiles to be demodulated.

25. The method of claim 24, wherein the processing the multiple subpackets comprises decoding each subpacket based on a forward error correction (FEC) code to obtain a corresponding decoded subpacket.

26. The method of claim 24, wherein the demapping the multiple subpackets comprises
demapping each of the multiple subpackets from at least one of a different subset of the multiple tiles, a particular minimum number of tiles, all of the multiple tiles if fewer than the particular minimum number of tiles, and an equal number of tiles.

27. An apparatus for communication, comprising:
means for determining resources assigned for transmission of a packet;
means for receiving multiple subpackets of the packet via the assigned resources;
means for demapping the multiple subpackets from the assigned resources, with at least one subpacket being demapped from a subset of the assigned resources; and
means for processing the multiple subpackets after demapping to recover the packet;
wherein the assigned resources comprise multiple tiles, and wherein the means for processing the multiple subpackets comprises
means for performing demodulation for each of the multiple tiles; and
means for performing decoding for each of the multiple subpackets when all tiles to which the subpacket is mapped have been demodulated without waiting for all of the multiple tiles to be demodulated.

28. The apparatus of claim 27, wherein the means for processing the multiple subpackets comprises means for decoding each subpacket based on a forward error correction (FEC) code to obtain a corresponding decoded subpacket.

29. The apparatus of claim 27, wherein the means for demapping the multiple subpackets comprises
means for demapping each of the multiple subpackets from at least one of a different subset of the multiple tiles, a particular minimum number of tiles, all of the multiple tiles if fewer than the particular minimum number of tiles, and an equal number of tiles.

30. A computer program product, comprising:
a non-transitory computer-readable medium comprising:
code for causing at least one computer to determine resources assigned for transmission of a packet, the assigned resources comprising multiple tiles;
code for causing the at least one computer to receive multiple subpackets of the packet via the assigned resources;
code for causing the at least one computer to demap the multiple subpackets from the assigned resources, with at least one subpacket being demapped from a subset of the assigned resources;
code for causing the at least one computer to process the multiple subpackets after demapping to recover the packet;
code for performing demodulation for each of the multiple tiles, and
code for performing decoding for each of the multiple subpackets when all tiles to which the subpacket is mapped have been demodulated without waiting for all of the multiple tiles to be demodulated.

31. A communication apparatus comprising:
at least one processor configured to determine resources assigned for transmission of a packet, to partition the packet into multiple subpackets, and to map the multiple subpackets to the assigned resources, with at least one subpacket being mapped to a subset of the assigned resources; and
a memory coupled to the at least one processor;

wherein the assigned resources comprise multiple tiles each corresponding to a block of contiguous time frequency resources; and wherein the at least one processor is configured to map each of the multiple subpackets to a particular minimum number of tiles greater than one or to all of the multiple tiles if fewer than the particular minimum number of tiles are available; and wherein the at least one processor is configured to determine a plurality of subpackets mapped to one of the tiles and to distribute a portion of each of the plurality of subpackets across the one tile.

32. The apparatus of claim 31 wherein the at least one processor is configured to map each of the multiple subpackets to an equal number of tiles greater than one.

33. An communication apparatus comprising:

means for determining resources assigned for transmission of a packet, means for partitioning the packet into multiple subpackets, and means for mapping the multiple subpackets to the assigned resources, with at least one subpacket being mapped to a subset of the assigned resources; and a memory coupled to the at least one processor;

wherein the assigned resources comprise multiple tiles each corresponding to a block of contiguous time frequency resources; and wherein the means for mapping are configured to map each of the multiple subpackets to a particular minimum number of tiles greater than one or to all of the multiple tiles if fewer than the particular minimum number of tiles are available; and wherein the means for mapping are configured to determine a plurality of subpackets mapped to one of the tiles and to distribute a portion of each of the plurality of subpackets across the one tile.

34. The apparatus of claim 33 wherein the means for mapping are configured to map each of the multiple subpackets to an equal number of tiles greater than one.

35. A computer program product residing on a non-transitory processor-readable medium of a communication apparatus and comprising processor-readable instructions configured to cause a processor to:

determine resources assigned for transmission of a packet, the assigned resources comprising multiple tiles each corresponding to a block of contiguous time frequency resources;

partition the packet into multiple subpackets; and map the multiple subpackets to the assigned resources, with each of the multiple subpackets being mapped to a particular minimum number of tiles greater than one or to all of the multiple tiles if fewer than the particular minimum number of tiles are available; and determine a plurality of subpackets mapped to one of the tiles and distribute a portion of each of the plurality of subpackets across the one tile.

36. The computer program product of claim 35 wherein the instructions configured to cause the processor to map the multiple subpackets are configured to cause the processor to map each of the multiple subpackets to an equal number of tiles greater than one.

* * * * *